I. A. OLIVER.
MOTOR CYCLE SADDLE.
APPLICATION FILED JULY 29, 1913.
1,153,817.
Patented Sept. 14, 1915.
2 SHEETS—SHEET 1.
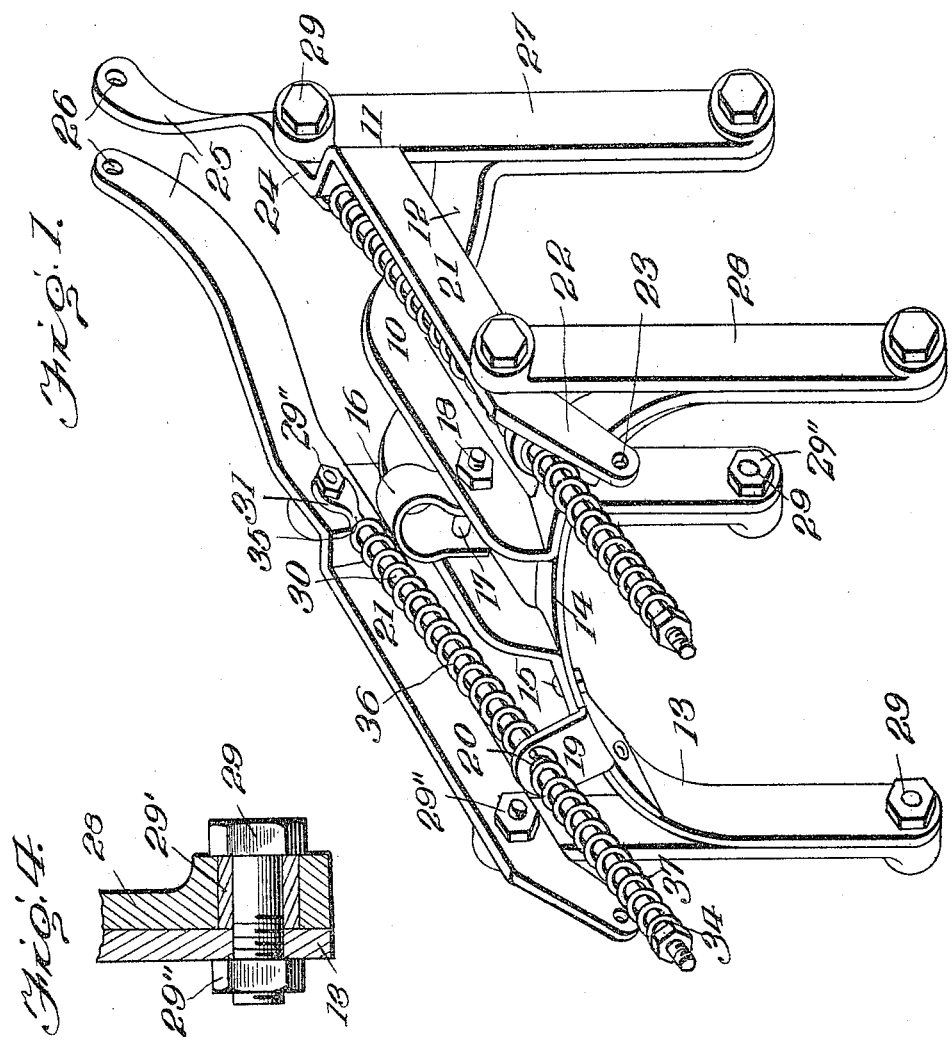
Inventor
I. A. Oliver.

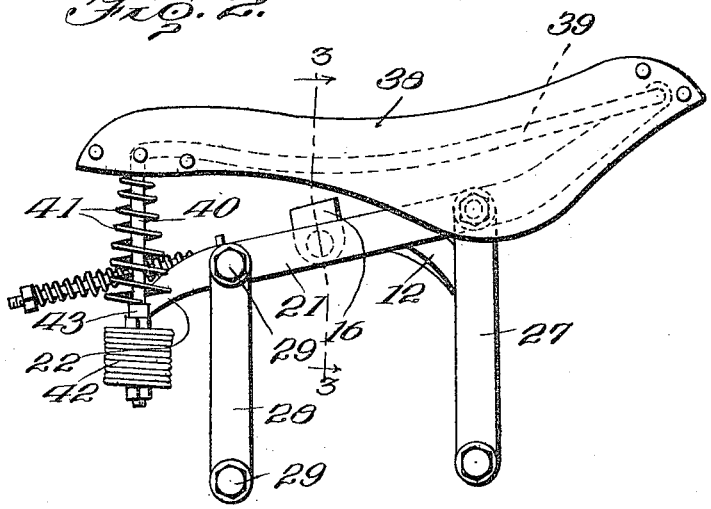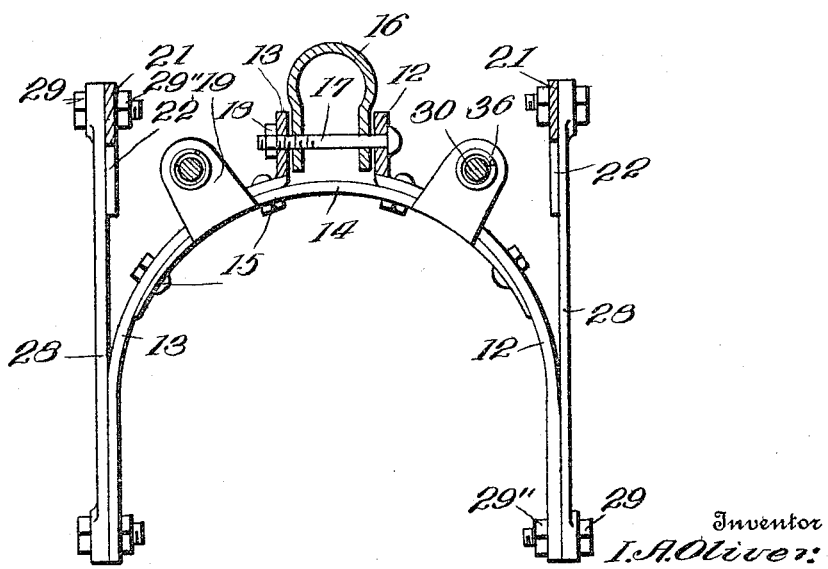

UNITED STATES PATENT OFFICE.

IMMANUEL ALVIN OLIVER, OF EDEN VALE, CALIFORNIA.

MOTOR-CYCLE SADDLE.

1,153,817.

Specification of Letters Patent.

Patented Sept. 14, 1915.

Application filed July 29, 1913. Serial No. 781,762.

*To all whom it may concern:*

Be it known that I, IMMANUEL A. OLIVER, citizen of the United States, residing at Eden Vale, in the county of Santa Clara and State of California, have invented certain new and useful Improvements in Motor-Cycle Saddles, of which the following is a specification.

My invention relates to new and useful improvements in frames for bicycle saddles and more particularly to frames for the saddles of motorcycles, the object of my invention being to provide a frame which will yieldably support the saddle for longitudinal movement with respect to the bicycle frame while at the same time cushioning and limiting such movement.

It is a well known fact that in addition to the shock tending to throw a rider forward or backward, due to the sudden stopping or starting of a motorcycle or sudden changes in speed, there is, at all times, when the motor is running, a constant forward and backward reciprocatory vibration of the frame. Although the shock due to the sudden changing of the speed is the greater this latter shock or vibration, due to the fact that it is continuous, is far more disagreeable. It will be readily apparent that if the rider's seat of the motorcycle is mounted for limited and cushioned longitudinal movement forward and backward, all this shock and vibration will be taken up by the saddle frame and will not be transmitted to the rider and the object of this invention is to provide a saddle frame which will have this cushioning effect.

A still further object of the invention is to provide a saddle frame including a fixed frame member straddling the frame of the bicycle proper and extending considerably below the saddle post and a second saddle carrying frame swingingly mounted upon the fixed frame for longitudinal movement, springs or other suitable cushioning elements being applied to limit and cushion such movement. And a still further object of my invention is to so arrange this second or movable frame that the bicycle saddle of conventional construction and employing the usual springs for cushioning the saddle against vertical vibration may be attached thereto without structural changes and in such a way that the vertical cushioning springs are in no way affected in their operation.

With these and other objects in view, my invention will be more fully described, illustrated in the accompanying drawings, and then specifically pointed out in the claims which are attached to and form a part of this application.

In the drawings: Figure 1 is a perspective view of my improved saddle frame, the saddle not being shown; Fig. 2 is a side elevational view of the saddle frame and saddle showing the manner of attaching the latter to the frame; Fig. 3 is a transverse sectional view on the line 3—3 of Fig. 2, the saddle again being omitted to permit a more complete showing of the frame construction; Fig. 4 is a fragmentary sectional view, showing the manner of pivotally connecting said parts of the saddle frame together.

Corresponding and like parts are referred to in the following description and indicated in all the views of the drawings by the same reference characters.

The preferred embodiment of my invention, as illustrated in the drawings and as previously set forth, includes a frame 10 adapted for rigid attachment to the seat post of a motorcycle and a second frame 11 mounted for forward and rearward swinging movement upon the first frame and adapted to receive and support the saddle proper.

The first of these frames includes a pair of substantially U-shaped members 12 and 13, each formed from a single bar of metal of sufficient strength to properly support the saddle and preferably resilient to more effectually cushion the same. Each of these frames has its bight portion offset to lie in a plane parallel to but spaced from the plane of the free end portions, the intermediate portion connecting one of the free end portions and the bight portion being curved inwardly and rearwardly and then upwardly to the bight portion, while that portion of the opposite side of the frame is curved directly upwardly and inwardly to the bight portion. As clearly seen by referring to Fig. 1 these two members 12 and 13 are symmetrically formed and those side portions of said members which, when the frame is assembled, form the rear portion of the frame, are connected by an arcuate brace or arch 14 in such a manner that the bight portions of the frame members 12 and 13 extend in parallel spaced relation to each other, while the end portions depend vertically in spaced relation. The brace 14 may be secured to the under faces of the members 12 and 13 by rivets 15 or any other suitable type of fastening.

A U-shaped spring band 16 has its ends bent inwardly slightly to seat between the intermediate parts of the bight portions of the frame members 12 and 13 and said end portions are perforated as are the frame members to receive a bolt 17 threaded to receive a clamping nut 18. This clamping band is adapted for engagement about the laterally directed terminal of a conventional motorcycle seat post and when in place the frame members 12 and 13 are clamped to the seat post by proper tightening of the nut 18, the fact that the frame members 12 and 13 are of resilient metal, together with the fact that their forward portions are unconnected readily permitting the drawing together of the band about the seat post. The brace or arch 14 is provided adjacent either end with rearwardly and upwardly directed ears 19 apertured as at 20 and the purpose of which will be hereinafter explained.

The second or saddle carrying frame member 11 includes side bars 21 which are symmetrically formed including a straight intermediate body portion having downwardly inclined rear end portions 22 perforated as at 23 for a reason which will be later clear and having their forward end portions offset inwardly as at 24 and then extended in a curve forwardly and inwardly as at 25, said forwardly and inwardly curved end portions being perforated at 26 and terminating in slightly spaced relation to each other. Pivoted to the inwardly offset portions of these side bars are links 27, while pivotally connected to the side bars adjacent their downwardly inclined rear ends are links 28. The lower or free ends of the links 27 are pivotally connected to the lower ends of the forward side portions of the U-shaped members 12 and 13 of the frame member 10, while the lower free ends of the links 28 are similarly connected to the free ends of the other side members of said frames. These links are preferably pivotally attached by bolts 29 of suitable strength to support the saddle and rider. The bolt receiving bores and the links are made sufficiently large to permit the employment of a bushing 29' about the shank of the bolt and the bolts are not only threaded into the U-shaped members 12 and 13 or side bars 21, but are further locked in place by nuts 29''.

From the foregoing description it will be apparent that the side members or bars 21 of the frame member 11 are mounted for forward and rearward or longitudinal swinging with respect to the frame member 10, which latter member, as previously set forth, is in use rigidly attached to the seat post of the motorcycle. It will further be apparent that due to the downwardly directed terminals of the U-shaped frame members 12 and 13, the side bars 21 will be supported at substantially the same level as the upper end of the seat post and that for this reason the saddle, which is attached to the side bars, as will be later explained, is not unduly raised with respect to the bicycle frame.

In order to cushion the swinging movement of these side bars and also limit the same, I provide each side bar with a guide rod 30, one end of which is flattened and perforated to form an eye 31 to receive the bolt 29 passed through the inwardly offset portion of its side bar and secured in place by a nut 29''. The opposite end of each guide rod extends through the aperture 20 of the ear 19 and is threaded to receive a nut 34. The forward ends of these guide rods adjacent their eyes are laterally offset as shown at 35 to abut against the adjacent inwardly extending portions of the side bars 21 and helical compression springs 36 surround the guide rods bearing between said offset portions and the ears 19. A second pair of helical compression springs 37 also surround the guide rods bearing between the ears 19 and the nuts 34. It will be seen that the springs 36 cushion the forward movement of the side bars, while the springs 37 cushion the rearward movement, both springs being normally under considerable tension. The tension of the springs may be readily varied at will by proper adjustment of the nuts 34.

Referring more specifically to Fig. 2 of the drawings in which 38 indicates a conventional form of motorcycle saddle having a saddle frame proper 39, it will be seen that said saddle is secured to my improved saddle supporting frame by passing the forward portion of the saddle frame proper 39 through the perforations 26 of the forward ends of the side bars 21 and by securing the conventional guide rods 40 carrying the compression springs 41 and 42 which cushion the saddle against vertical movement to the rear ends of the side bars 21, this latter attachment being accomplished by means of collars 43 surrounding the guide rods and having threaded studs passed through the perforations 23 to receive clamping nuts. By this means a motorcycle saddle of conventional type, together with its usual springs, may be readily attached to my improved supporting frame in such a manner that the action of the springs of the saddle proper is in no way interfered with.

The saddle, when mounted upon the supporting frame as shown in Fig. 2, is cushioned against vertical vibrations by the usual springs 41 and 42 and its vertical movement limited thereby, while at the same time the saddle is free for limited forward and rearward movement with respect to the seat post and consequently the frame of the motorcycle, this latter movement being cushioned by the springs 36 and 37.

By attaching the movable frame member 11 to the lower ends of the frame members 12 and 13, the center of gravity of the saddle and its load is lowered and the safety of the seat insured.

It will of course be understood that various changes in construction may be made at any time, if desired, within the scope of the appended claims, without in the slightest degree departing from the spirit of my invention, the drawings and description thereof herein contained illustrating and explaining merely the preferred embodiment of my invention such as constitutes a disclosure of the principle involved.

Having thus described the invention, what is claimed as new is:

1. A motorcycle saddle frame including a frame member adapted for rigid attachment to a seat post, a second frame member adapted for attachment to a saddle, said second frame being secured to the first for longitudinal movement with respect thereto, and adjustable means for limiting said movement.

2. A motorcycle saddle frame including a frame member adapted for rigid attachment to a seat post, a second frame member adapted for attachment to a saddle, said second frame being secured to the first for longitudinal movement with respect thereto, and adjustable means for cushioning said movement.

3. A motorcycle saddle frame including a frame member adapted for rigid attachment to a seat post, a second frame member adapted for attachment to a saddle, said second frame being secured to the first for longitudinal movement with respect thereto, and adjustable means for limiting and cushioning said movement.

4. A motorcycle saddle frame including a frame member adapted for rigid attachment to a seat post, a second frame member adapted for attachment to a saddle, said second frame being secured to the first for longitudinal movement with respect thereto, and adjustable means for limiting and cushioning said movement, said means including guide rods pivoted to one of the frames and movable through perforated ears carried by the other frame, nuts threaded upon the ends of said guide rods, and compression springs surrounding the guide rods and bearing between the first frame and second frame and between the first frame and nuts.

5. A motorcycle saddle frame including a frame member adapted for rigid attachment to a seat post and having pairs of downwardly depending spaced arms, parallel side bars adapted for attachment to a saddle, links pivotally connected by their upper ends to the side bars and by their lower ends to the lower ends of the arms, and cushion means for limiting the swinging movement of said links.

6. A motorcycle saddle frame including U-shaped frame members having their bight portions offset laterally toward each other to extend in spaced relation and their side portions directed downwardly, a brace connecting adjacent side portions and provided with upwardly directed perforated ears, links pivotally connected to the free ends of the downwardly directed sides of the frame members and extending upwardly therefrom, side bars pivotally connected to the upper ends of said links and extending in spaced relation, guide rods swingingly secured to the side bars and extending through the perforations of the ears, nuts threaded upon the ends of said guide rods, and helical compression springs surrounding the guide rods between the nuts and ears and between the ears and side bars.

7. A motorcycle saddle frame including a frame member adapted for rigid attachment to a seat post and having pairs of downwardly depending spaced arms, parallel side bars adapted for attachment to a saddle, and links pivotally connected by their upper ends to the side bars and by their lower ends to the lower ends of the arms.

8. A motorcycle saddle frame including a frame member adapted for rigid attachment to a seat post and having pairs of downwardly depending spaced arms, parallel side bars adapted for attachment to a saddle, links pivotally connected by their upper ends to the side bars and by their lower ends to the lower ends of the arms, and means for limiting the swinging movement of said links.

9. A motorcycle saddle frame including U-shaped frame members, a brace connecting one leg of one frame member to the corresponding leg of the other to hold them in spaced relation, the other legs being free of attachment, a seat post engaging clamp carried by the bight portions of such frame members, side bars adapted for attachment to a saddle, and links swingingly connecting the side bars with the free ends of the first frame members.

10. A motorcycle saddle frame including U-shaped frame members, a brace connecting one leg of one frame member to the corresponding leg of the other to hold them in spaced relation, the other legs being free of attachment, a seat post engaging clamp carried by the bight portions of such frame members, side bars adapted for attachment to a saddle, links swingingly connecting the side bars with the free ends of the first frame members, and cushioning means limiting the swinging of the side bars with respect to the first frame members.

11. A motorcycle saddle frame including U-shaped frame members having their bight portions offset laterally toward each other to extend in spaced relation and their side portions directed downwardly, a brace connecting a pair of adjacent side portions, the other pair being free of attachment, whereby the bight portions may be sprung toward and away from each other, a U-shaped spring band having its end portions inserted between the intermediate parts of the bight portions, a clamping bolt passed through such parts of the bight portions and the ends of the band, a clamping nut on the bolt to spring the side portions toward each other and draw the ends of the band toward each other to clamp the band about a saddle post, and a saddle supporting second frame swingingly supported upon the first frame.

12. A motorcycle saddle frame including a frame member adapted for rigid attachment to a seat post and having pairs of downwardly depending spaced arms, parallel side bars adapted for attachment to a saddle, links pivotally connected by their upper ends to the side bars and by their lower ends to the lower ends of the arms, and means for cushioning the movement of said links.

In testimony whereof I affix my signature in presence of two witnesses.

IMMANUEL ALVIN OLIVER.

Witnesses:
JNO. LOGAN,
J. W. GOULD.

Copies of this patent may be obtained for five cents each, by addressing the "Commissioner of Patents, Washington, D. C."